(12) United States Patent
Lee

(10) Patent No.: US 9,594,613 B2
(45) Date of Patent: Mar. 14, 2017

(54) HEALTH MONITORING APPARATUS AND METHOD IN AERONAUTIC SYSTEM

(71) Applicant: ELECTRONICS AND TELECOMMUNICATIONS RESEARCH INSTITUTE, Daejeon (KR)

(72) Inventor: Hwa Young Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 100 days.

(21) Appl. No.: 14/592,978

(22) Filed: Jan. 9, 2015

(65) Prior Publication Data

US 2015/0278065 A1   Oct. 1, 2015

(30) Foreign Application Priority Data

Mar. 28, 2014 (KR) ........................ 10-2014-0037020

(51) Int. Cl.
    *G06F 11/00* (2006.01)
    *G06F 11/07* (2006.01)
    *G06F 11/30* (2006.01)

(52) U.S. Cl.
    CPC ...... *G06F 11/0739* (2013.01); *G06F 11/0712* (2013.01); *G06F 11/0781* (2013.01); *G06F 11/0793* (2013.01); *G06F 11/3013* (2013.01)

(58) Field of Classification Search
    CPC ............. G06F 11/0712; G06F 11/0739; G06F 11/0781; G06F 11/0793; G06F 11/3013; G06F 11/079

(Continued)

(56) References Cited

U.S. PATENT DOCUMENTS

| 8,161,323 B2 * | 4/2012 | Kuchibhotla ....... G06F 11/0748 714/25 |
| 2007/0260726 A1 * | 11/2007 | Rozak ................... G06Q 10/06 709/224 |

(Continued)

FOREIGN PATENT DOCUMENTS

| KR | 10-2002-0063237 A | 8/2002 |
| KR | 10-2003-0015238 A | 2/2003 |

(Continued)

OTHER PUBLICATIONS

KIPO Office Action for Korean Application No. 10-2014-0037020 which corresponds to the above-referenced U.S. application.

*Primary Examiner* — Joseph D Manoskey
(74) *Attorney, Agent, or Firm* — LRK Patent Law Firm

(57) ABSTRACT

Provided herein is a health monitoring apparatus that is capable of increasing the reliability and stability of an aviation system, the health monitoring apparatus including a health monitoring manager configured to receive a sensed error from an aeronautic system control apparatus, and to activate one of a process level monitor, a partition level monitor, and a module level monitor according to an error level of the sensed error, and a monitor unit comprising the process level monitor, the partition level monitor, and the module level monitor that are integrated into one system by a partitioning method, wherein the one of the process level monitor, the partition level monitor, and the module level monitor that is activated by the health monitoring manager performs error handling and provides an error processing method suitable to the sensed error to the aeronautic system control apparatus.

8 Claims, 2 Drawing Sheets

(58) Field of Classification Search
USPC .............................. 714/26, 25, 27, 38.1, 47.1
See application file for complete search history.

(56) References Cited

U.S. PATENT DOCUMENTS

2013/0013953 A1* 1/2013 Eck .................... G06F 9/45545
714/2
2013/0274992 A1* 10/2013 Cheriere ............... B64F 5/0081
701/32.9

FOREIGN PATENT DOCUMENTS

| KR | 10-2012-0088304 A | 8/2012 |
| KR | 10-2013-0067454 A | 6/2013 |
| KR | 10-2014-0077794 A | 6/2014 |
| WO | 01/44881 A1 | 6/2001 |
| WO | 01/86442 A2 | 11/2001 |

* cited by examiner

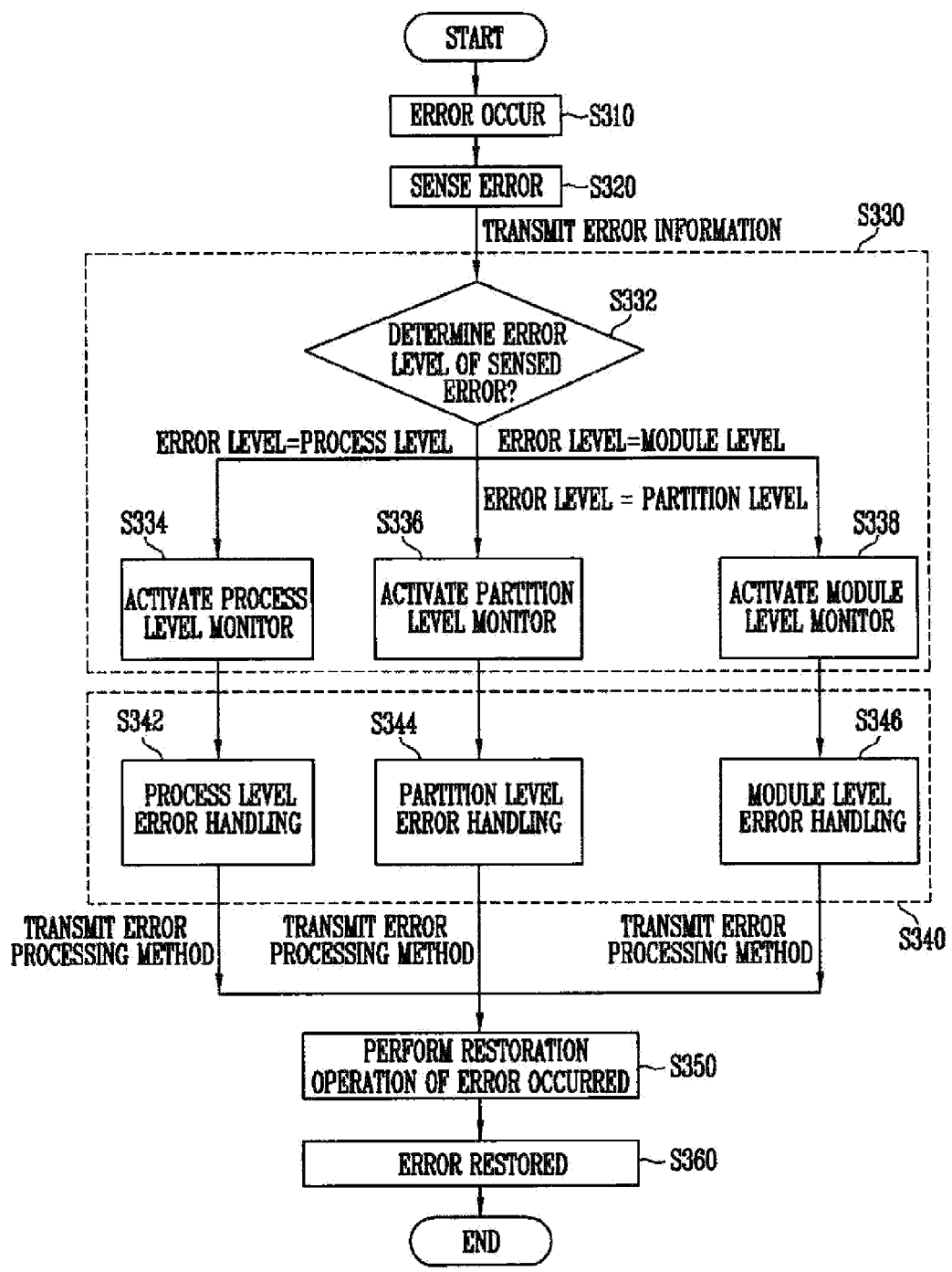

HEALTH MONITORING APPARATUS AND METHOD IN AERONAUTIC SYSTEM

CROSS-REFERENCE TO RELATED APPLICATION

The present application claims priority to Korean patent application number 10-2014-0037020, filed on Mar. 28, 2014, the entire disclosure of which is incorporated herein in its entirety by reference.

BACKGROUND

Field of Invention

Various embodiments of the present invention relate to an avionics application system where aviation software development technologies are integrated with methods for monitoring online distributed processing, and more particularly to a health monitoring apparatus and method in an aeronautic system.

Description of Related Art

Avionics is a compound word of aviation and electronics, referring to components and fine systems mounted on airplanes that are operated by electronic technologies. Therefore, an avionics system consists of various electronic apparatuses in order to perform various types of tasks.

As the number of electronic apparatuses embedded in an avionics system continues to increase due to the increasing number of tasks, integrated modular avionics systems where electronic apparatuses are integrated into one system are used instead of federated avionics systems where electronic apparatuses are configured independently.

An integrated modular avionics system integrates the electronic apparatuses of a conventional federated avionics system into one computer equipment, and thus has an advantage of reducing the size, weight, and power consumption of the computer equipment.

However, in order to configure such an integrated modular avionics system, there needs to be a standard for guaranteeing a real time operating system and the independency of application programs.

ARINC 653 is a specification for aviation software development, and an API standard for a real-time operating system required in an integrated modular avionics system. That is, ARINC 653 defines an application interface between a real-time operating system and application programs operating on the real-time operating system.

Therefore, with aviation software developed based on the aforementioned API standard, it is possible to reduce the dependency on development hardware, extend the portability to other systems, and improve simultaneous application development capabilities.

Furthermore, ARINC 653 can provide various services such as a partition management, process management, time management, memory allocation, interpartition communication, intrapartition communication and health monitor.

Especially, the health monitor is a function of an OS (operating system) that monitors errors of hardware, application, and OS (operating system) and reports the errors to a CPU. It may also prevent errors occurred in one system from affecting another system.

However, in a conventional aeronautic system, the health monitor exists inside the ARINC 653 system, and thus when a problem occurs in the ARINC 653 system, the health monitor cannot operate normally, thereby deteriorating the reliability of the aeronautic system.

Furthermore, in such a conventional aeronautic system, each of the monitors and an apparatus for determining error levels included in the health monitor exist in an independent and layered structure, thereby decreasing the stability of the aeronautic system and increasing the development costs of the aeronautic system.

SUMMARY

A purpose of various embodiments of the present invention is to resolve the aforementioned problems, and especially to provide a health monitoring apparatus that is capable of increasing the reliability and stability of an aeronautic system.

Another purpose of the various embodiments of the present invention is to provide a health monitoring method that is capable of increasing the reliability and stability of an aeronautic system.

According to an embodiment of the present invention, there is provided a health monitoring apparatus in an aviation system, the apparatus including a health monitoring manager configured to receive a sensed error from an aeronautic system control apparatus, and to activate one of a process level monitor, a partition level monitor, and a module level monitor according to an error level of the sensed error, and a monitor unit including the process level monitor, the partition level monitor, and the module level monitor that are integrated into one system by a partitioning method, wherein the one of the process level monitor, the partition level monitor, and the module level monitor that is activated by the health monitoring manager performs error handling and provides an error processing method suitable to the sensed error to the aeronautic system control apparatus.

Herein, the health monitoring manager may include an error level detector configured to determine the error level of the sensed error, and an error level monitor scheduler configured to activate the one of the process level monitor, the partition level monitor, and the module level monitor according to a result of determination by the error level detector.

Herein, the error level detector may be configured to determine the error level suitable to the sensed error by performing a search in a system health monitoring table where error levels of errors occurring in the aeronautic system are prestored.

Herein, the process level monitor may determine the error processing method suitable to the sensed error by performing a search in a process level health monitoring table where error processing methods for a process level are prestored, when the process level monitor is activated, the partition level monitor may determine the error processing method suitable to the sensed error by performing a search in a partition level health monitoring table where error processing methods—for a partition level are prestored, when the partition level monitor is activated, and the module level monitor may determine the error processing method suitable to the sensed error by performing a search in a module level health monitoring table where error processing methods for a module level are prestored, when the module level monitor is activated.

According to an embodiment of the present invention, there is provided a health monitoring method in an aeronautic system, the method including activating one of a process level monitor, a partition level monitor, and a module level monitor that are integrated into one system by a partitioning method, according to an error level of a sensed error, and determining, by the one of the process level monitor, the partition level monitor, and the module level monitor that is activated, an error processing method suitable to the sensed error by performing error handling.

Herein, the activating of the one of the process level monitor, the partition level monitor, and the module level monitor may include determining the error level of the sensed error, and activating the one of the process level monitor, the partition level monitor, and the module level monitor according to a result of determination of the error level.

Herein, the determining of the error level of the sensed error may include determining the error level suitable to the sensed error by performing a search in a system health monitoring table where error levels of errors occurring in the aeronautic system are prestored.

Herein, the determining of the error processing method suitable to the sensed error may include determining the error processing method suitable to the sensed error by performing a search in a process level health monitoring table where error processing methods for a process level are prestored, when the process level monitor is activated, determining the error processing method suitable to the sensed error by performing a search in a partition level health monitoring table where error processing methods for a partition level are prestored, when the partition level monitor is activated, and determining the error processing method suitable to the sensed error by performing a search in a module level health monitoring table where error processing methods for a module level are prestored, when the module level monitor is activated.

According to the aforementioned various embodiments of the present invention, since the health monitoring apparatus and the ARINC 653 system are independent from each other, the health monitoring apparatus can operate normally even when a problem occurs in the ARINC 653 system, thereby providing an effect of increasing the reliability of the aeronautic system.

Furthermore, according to the aforementioned various embodiments of the present invention, each of the monitors are controlled by the health monitoring manager to be independent from one another spatially and temporally, thereby providing an effect of further increasing the stability of the aeronautic system.

Moreover, according to the aforementioned various embodiments of the present invention, the monitors may be embodied as one system integrated by a partitioning method, thereby providing an effect of further improving the efficiency of the aeronautic system.

In addition, according to the aforementioned various embodiments of the present invention, the monitors may be integrated into one system, thereby providing an effect of further reducing the development costs of the aeronautic system.

BRIEF DESCRIPTION OF THE DRAWINGS

The above and other features and advantages of the present invention will become more apparent to those of ordinary skill in the art by describing in detail embodiments with reference to the attached drawings in which:

FIG. 2 is a flowchart of an error processing method in an aeronautic system according to an embodiment of the present invention.

DETAILED DESCRIPTION

Figure 1:
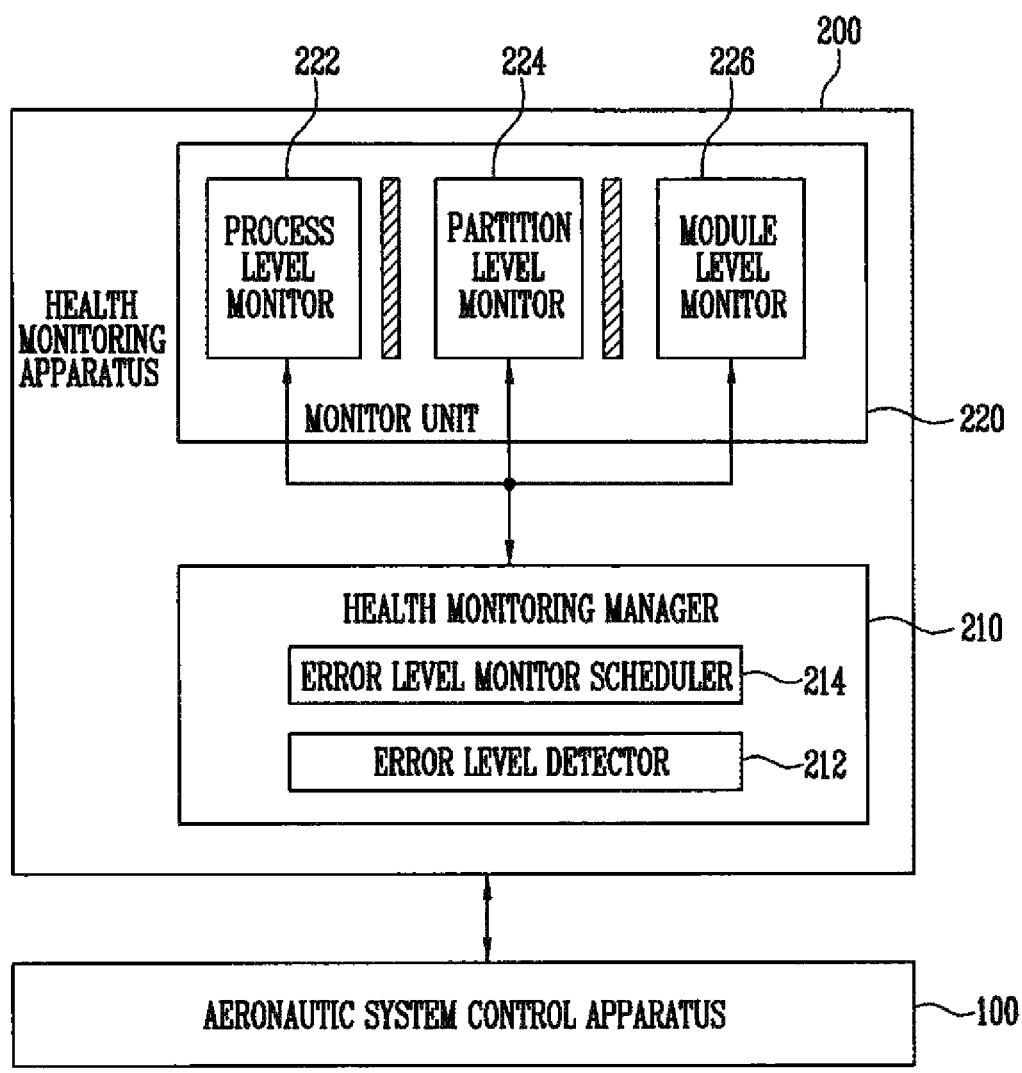
FIG. 1 is a block diagram illustrating an aeronautic system according to an embodiment of the present invention.

Hereinafter, embodiments will be described in greater detail with reference to the accompanying drawings. Embodiments are described herein with reference to cross-sectional illustrates that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first', 'second', A, and B may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

Furthermore, 'connected' represents that one component is directly connected to another component or indirectly connected through another component. In this specification, a singular form may include a plural form as long as it is not specifically mentioned in a sentence.

In this specification, a singular form may include a plural form as long as it is not specifically mentioned in a sentence. Furthermore, 'include/comprise' or 'including/comprising' used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinbelow, a health monitoring apparatus in an aeronautic system according to an embodiment of the present invention will be explained with reference to the attached drawings.

FIG. 1 is a block diagram illustrating an aeronautic system according to an embodiment of the present invention.

Referring to FIG. 1, the aeronautic system according to an embodiment of the present invention includes an aeronautic system control apparatus 100 and health monitoring, apparatus 200.

The aeronautic system control apparatus 100 may include an ARINC 653 system configured to perform control operations in accordance with the ARINC 653 standard.

Herein, the ARINC 653 system may provide partition management, process management, time management, memory allocation, interpartition communication, and intrapartition communication services.

Furthermore, the aeronautic system control apparatus 100 may sense an error occurring in the aeronautic system, and provide the sensed error to the health monitoring apparatus 200 that will be explained hereinafter. Herein, various pieces of information on the error occurring in the aeronautic system may be included in the sensed error.

The health monitoring apparatus 200 may be configured as an independent apparatus from the aforementioned aeronautic system control apparatus 100.

Therefore, compared to a conventional aeronautic system where a health monitor is configured inside an ARINC 653 system, an aeronautic system according to an embodiment of the present invention is configured to have a health monitoring apparatus and an ARINC 653 system independent from each other, and thus even when a problem occurs in the ARINC 653 system, the health monitoring apparatus can operate normally, thereby further increasing the reliability of the aeronautic system.

Referring to FIG. 1, the health monitoring apparatus 200 may include a health monitoring manager 210 and a monitor unit 220.

The health monitoring manager 210 may receive the sensed error from the aeronautic system control apparatus 100. Furthermore, the health monitoring manager 210 may activate one of a process level monitor 222, a partition level monitor 224, and a module level monitor 226 of the monitor unit 220 that will be explained hereinafter according to an error level of the sensed error.

Furthermore, the health monitoring manager 210 may include an error level detector 212 and an error level monitor scheduler 214.

The error level detector 212 may receive the sensed error from the aeronautic system control apparatus 100. Furthermore, the error level detector 212 may determine an error level of the sensed error.

Meanwhile, the error level of an error occurring in the aviation system may be a process level, a partition level, or a module level.

In an embodiment, the error level detector 212 may include a system health monitoring table where the error levels of the errors occurring in the aeronautic system are prestored. Therefore, the error level detector 212 may determine the error level suitable to the sensed error by performing a search in the system health monitoring table.

In another embodiment, as aforementioned, the error level detector 212 may, but is not limited to, determine the error level using the system health monitoring table. Any method may be used that is capable of determining the error level of the sensed error.

The error level monitor scheduler 214 may receive a result of determination of the error level of the sensed error from the error level detector 212. Furthermore, the error level monitor scheduler 214 may activate one of the process level monitor 222, the partition level monitor 224, and the module level monitor 226 that will be explained hereinafter according to the result of determination by the error level detector 212.

Therefore, compared to a conventional aeronautic system having a health monitoring apparatus where each of the monitors and an apparatus for determining an error level have a layered structure, an aeronautic system according to an embodiment of the present invention has a health monitoring apparatus where each of the monitors are controlled to be independent from one another spatially and temporally by the health monitoring manager, thereby further increasing the stability of the aeronautic system.

Referring to FIG. 1, the monitor unit 220 may include the process level monitor 222, the partition level monitor 224, and the module level monitor 226.

Herein, the monitor unit 220 may be a system where the process level monitor 222, the partition level monitor 224, and the module level monitor 226 are integrated into one system by a partitioning method.

Therefore, compared to a conventional aeronautic system having a health monitoring where the monitors are independent from each other and have a layered structure, an aeronautic system according to an embodiment of the present invention has a health monitoring apparatus where the monitors are configured as one integrated system by the partitioning method, thereby further increasing the efficiency of the aeronautic system.

Furthermore, integrating the monitors into one system may further reduce the development cost for the aeronautic system.

In addition, one of the process level monitor 222, the partition level monitor 224, and the module level monitor 226 that is activated by the health monitoring manager 210 may perform error handling and determine an error processing method suitable to the sensed error. Furthermore, the monitor unit 220 may provide the determined error processing method to the aforementioned aeronautic system control apparatus 100.

Herein, the process level monitor 222 may include a process level health monitoring table where error processing methods for the process level are prestored.

Herein, the partition level monitor 224 may include a partition level health monitoring table where error processing methods for the partition level are prestored.

Herein, the module level monitor 226 may include a module level health monitoring table where error processing methods for the module level are prestored.

Therefore, the monitor unit 220 may perform a search in the health monitoring table included in each of the aforementioned monitors 222, 224, 226 and perform error handling.

That is, when the process level monitor 222 is activated by the health monitoring manager 210, the process level monitor 222 may determine the error processing method suitable to the sensed error by performing a search in the process level health monitoring table, and provide the determined error processing method to the aforementioned aeronautic system control apparatus 100.

Furthermore, when the partition level monitor 224 is activated by the health monitoring manager 210, the partition level monitor 224 may determine the error processing method suitable to the sensed error by performing a search in the partition level health monitoring table, and provide the determined error processing method to the aforementioned aeronautic system control apparatus 100.

Furthermore, when the module level monitor 226 is activated by the health monitoring manager 210, the module level monitor 226 may determine the error processing method suitable to the sensed error by performing a search in the module level health monitoring table, and provide the determined error processing method to the aforementioned aeronautic system control apparatus 100.

Meanwhile, as aforementioned, the monitor unit 220 may, but is not limited to, perform a search in the health monitoring table of each monitor 222, 224, 226 and perform error handling. Any error handling method may be used as long as it is capable of determining the error processing method suitable to the sensed error.

Referring to FIG. 1, the aeronautic system control apparatus 100 may receive the determined error processing method from the health monitoring apparatus 200. Furthermore, the aeronautic system control apparatus 100 may perform a restoration operation on the error that occurred in the aeronautic system according to the determined error processing method.

Hereinbelow, a health monitoring method in an aeronautic system according to an embodiment of the present invention will be explained with reference to the drawings attached. Especially, explanation on configurations that overlap with the health monitoring apparatus in the aeronautic system according to the aforementioned embodiment of the present invention will be omitted for conciseness of explanation.

FIG. 2 is a flowchart of an error processing method in an aeronautic system according to an embodiment of the present invention.

Referring to FIG. 2, an error may occur in the aeronautic system (S310).

Then, the aeronautic system control apparatus may sense the error, and provide the sensed error to the health monitoring apparatus (S320).

Herein, various pieces of information on the error that occurred in the aviation system may be included in the sensed error.

Herein, the aeronautic system control apparatus and health monitoring apparatus correspond to the aeronautic system control apparatus 100 and health monitoring apparatus 200 aforementioned with reference to FIG. 1, and thus repeated explanation is omitted for conciseness.

Then, one of a process level monitor, a partition level monitor and a module level monitor that are integrated into one system by a partitioning method may be activated in accordance with an error level of the sensed error (S330).

Herein, after S320, the error level of the sensed error may be determined (S332).

That is, the error level suitable to the sensed error may be determined by performing a search in a system health monitoring table where error levels of errors occurring in the aeronautic system are prestored.

Especially, the error level of an error occurring in the aviation system may be a process level, a partition level, or a module level.

Herein, after S332, based on a result of determination of the error level, one of the process level monitor, the partition level monitor, and the module level monitor may be activated (S334, S336, S338).

Then, the activated monitor may perform error handling, and determine an error processing method suitable to the sensed error (S340).

That is, when the process level monitor is activated (S334), the error processing method suitable to the sensed error may be determined by performing a search in a process level health monitoring table where error processing methods for the process level are prestored (S342).

Furthermore, when the partition level monitor is activated (S336), the error processing method suitable to the sensed error may be determined by performing a search in a partition level health monitoring table where error processing methods for the partition level are prestored (S344).

Furthermore, when the module level monitor is activated (S338), the error processing method suitable to the sensed error may be determined by performing a search in a module level health monitoring table where error processing methods—for the module level are prestored (S346).

Then, the aeronautic system control apparatus may receive the determined error processing method, and perform a restoration operation on the error that occurred in the aeronautic system in accordance with the determined error processing method (S350).

Then, the error occurred in the aeronautic system may be restored (S360). That is, the aeronautic system may be restored.

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A health monitoring apparatus in an aeronautic system including an aeronautic system control apparatus and the health monitoring apparatus, the health monitoring apparatus comprising:
   at least one hardware processor and a storage;
   a health monitoring manager loaded on the at least one hardware processor and configured to receive a sensed error from the aeronautic system control apparatus, and to activate one of a process level monitor, a partition level monitor, and a module level monitor according to an error level of the sensed error; and
   a monitor unit loaded on the at least one hardware processor and comprising the process level monitor, the partition level monitor, and the module level monitor that are integrated into one system by a partitioning method, wherein the one of the process level monitor, the partition level monitor, and the module level monitor that is activated by the health monitoring manager performs error handling and provides an error processing method suitable to the sensed error to the aeronautic system control apparatus,
   wherein the aeronautic system control apparatus and the health monitoring apparatus are separated from each other in the aeronautic system.

2. The health monitoring apparatus according to claim 1, wherein the health monitoring manager comprises:
   an error level detector configured to determine the error level of the sensed error; and
   an error level monitor scheduler configured to activate the one of the process level monitor, the partition level monitor, and the module level monitor according to a result of determination by the error level detector.

3. The health monitoring apparatus according to claim 2, wherein the error level detector is configured to determine the error level suitable to the sensed error by performing a search in a system health monitoring table where error levels of errors occurring in the aeronautic system are prestored.

4. The health monitoring apparatus according to claim 3, wherein the process level monitor determines the error processing method suitable to the sensed error by performing a search in a process level health monitoring table where error processing methods for a process level are prestored, when the process level monitor is activated,
   the partition level monitor determines the error processing method suitable to the sensed error by performing a search in a partition level health monitoring table where error processing methods for a partition level are prestored, when the partition level monitor is activated, and
   the module level monitor determines the error processing method suitable to the sensed error by performing a search in a module level health monitoring table where error processing methods for a module level are prestored, when the module level monitor is activated.

5. A health monitoring method in an aeronautic system including an aeronautic system control apparatus and a health monitoring apparatus separated from each other, the method comprising:
    activating one of a process level monitor, a partition level monitor, and a module level monitor that are integrated into one system by a partitioning method, according to an error level of a sensed error from the aeronautic system control apparatus; and
    determining, by the one of the process level monitor, the partition level monitor, and the module level monitor that is activated, an error processing method suitable to the sensed error by performing error handling.

6. The method according to claim 5,
wherein the activating of the one of the process level monitor, the partition level monitor, and the module level monitor comprises:
determining the error level of the sensed error; and
activating the one of the process level monitor, the partition level monitor, and the module level monitor according to a result of determination of the error level.

7. The method according to claim 6,
wherein the determining of the error level of the sensed error comprises determining the error level suitable to the sensed error by performing a search in a system health monitoring table where error levels of errors occurring in the aeronautic system are prestored.

8. The method according to claim 7,
wherein the determining of the error processing method suitable to the sensed error comprises:
determining the error processing method suitable to the sensed error by performing a search in a process level health monitoring table where error processing methods for a process level are prestored, when the process level monitor is activated,
determining the error processing method suitable to the sensed error by performing a search in a partition level health monitoring table where error processing methods for a partition level are prestored, when the partition level monitor is activated, and
determining the error processing method suitable to the sensed error by performing a search in a module level health monitoring table where error processing methods for a module level are prestored, when the module level monitor is activated.

* * * * *